(12) United States Patent
Dellacherie et al.

(10) Patent No.: US 6,466,646 B1
(45) Date of Patent: Oct. 15, 2002

(54) METHOD FOR VERIFYING THE PROPER FUNCTIONING OF A SYSTEM

(75) Inventors: Samuel Dellacherie, Caen; Christophe Broult, Briouze; Samuel Devulder, Saint-Contest; Jean-Luc Lambert, Amfreville, all of (FR)

(73) Assignee: Valiosys, Amfreville (FR)

( * ) Notice: Subject to any disclaimer, the term of this patent is extended or adjusted under 35 U.S.C. 154(b) by 0 days.

(21) Appl. No.: 09/555,714

(22) PCT Filed: Dec. 1, 1998

(86) PCT No.: PCT/FR98/02582
§ 371 (c)(1),
(2), (4) Date: Jul. 13, 2000

(87) PCT Pub. No.: WO99/28820
PCT Pub. Date: Jun. 10, 1999

(30) Foreign Application Priority Data

Dec. 3, 1997 (FR) .............................................. 97 15217

(51) Int. Cl.⁷ .......................... H04M 1/24; G06F 11/00
(52) U.S. Cl. ............... 379/1.01; 379/10.03; 379/16; 379/22; 379/34.01; 370/241; 370/247; 370/248
(58) Field of Search ................. 379/1.01, 2, 9, 379/10.01, 10.03, 12, 16, 22, 26.02, 29.02, 29.1, 32.01; 370/241, 247, 248, 252, 255, 351, 480

(56) References Cited

U.S. PATENT DOCUMENTS 5,274,838 A * 12/1993 Childress et al. ............... 455/9
5,727,051 A * 3/1998 Holender .................... 379/112
5,764,740 A * 6/1998 Holender .................... 379/112
5,920,607 A * 7/1999 Berg ............................. 379/1

OTHER PUBLICATIONS

T. Higashino, et al.,<<Automatic Analysis and Test Case Derivation for a Restricted Class of Lotos Expressions with Data Parameters>>, IEEE Transactions on Software Engineering, vol. 20, No. 1, Jan. 1, 1994, pp. 29–42.
"Preprocessor for Linear and Mixed Integer Programming Models", IBM Technical Disclosure Bulletin, vol. 32, No. 5A, Oct. 1989, pp. 192–193.
H. J. Greenberg, <<The Analyze rulebase for supporting LP analysis>>, Annals of Operations Research, vol. 65, 1996, pp. 91–126.

* cited by examiner

Primary Examiner—Binh Tieu
(74) Attorney, Agent, or Firm—Marshall, Gerstein & Borun.

(57) ABSTRACT

The invention concerns a method which consists in modelling the system under study using a system of automatons synchronised by a set of messages; in deriving from said modelling a system of linear equations whereof the unknowns are related to the status of the automatons, to the occurrence of transitions in the automatons, and to the production of synchronisation messages between automatons. These unknowns have in principle a value of 0 or 1, and they each concern an operating step among T successive steps; in defining a property to be verified using additional linear constraints to which the equation system unknowns are subjected; then in applying a method of resolution by linear programming to the equation system subjected to the additional constraints, thereby enabling to prove that the property is verified, by displaying a solution, or that the property is not verified, by displaying an absence of solution.

4 Claims, 6 Drawing Sheets

AUTOMATON $S_1$ / TELEPHONE X
(Disconnected)

(connected)

AUTOMATON $S_4$/CHANNEL X→Y
(NO PACKET OF 2 MESSAGES)

(PACKET OF 2 MESSAGES IN TRANSIT)

AUTOMATE $S_4$/CHANNEL X→Y
(NO MESSAGE)

(message in transit)

METHOD FOR VERIFYING THE PROPER FUNCTIONING OF A SYSTEM

BACKGROUND OF THE INVENTION

The present invention relates to the field of verification of systems.

The systems to which the invention can be applied can be of very diverse kinds. They include in particular sequential or parallel data processing software, communication protocols, control and command systems, distributed systems, electronic components, etc. As a general rule, the invention is applicable to any physical system whose operation can be modelled in the form of communicating automata.

By "model" is meant an abstraction of the system enabling its operation to be parameterised. In the present instance, it is the translation of the system into the form of automata. The translation must of course preserve the properties of the system as much as possible, whilst allowing flexibility in respect of the verification methods employed.

The term "automaton" means a parametric representation of a part of the system, formed of states and transitions (i.e. of labelled points and arcs) enabling its operation to be described. An automaton can be described in various forms: graphically, textually, in the form of a data processing process, etc. A communicating automaton is an automaton which can exchange information with other automata in the form of sending of messages, synchronisations, etc.

In the context of the present invention, verification consists of demonstrating that the properties of the system as represented by automata are true or false, by exhibiting a path or by proving that a path cannot exist, a path being a succession (obviously a possible succession) of global states of the model. The path gives the ordered sequence of each state of each element of the model. In the present instance, this will be the ordered sequence of states of each automaton constituting the model.

It should be noted that as a general rule the verification is performed on a model and not on the system itself. In this respect it differs from testing, which is more directly related to the finished product. Testing consists of causing the real system to operate (for example the software to execute) to study its behaviour, attempting to cover its operation to the maximum. Many verification workshops enable the real system (the software) to be generated automatically from the model or its specifications to be defined. There is a relatively large number of modelling and verification aid tools (see, for example, A. A. Loureiro et al.: "Fdt tools for protocol development", in FORTE'92, 1992).

In the field of verification. three types of methods are most often employed:

1. Simulation. Most existing tools enable simulation. It corresponds to running through the states of the model one after the other in accordance with a more or less sophisticated strategy, in order to look for pertinent paths. This method has the advantage that it can be used at any level of abstraction of the system (provided that the abstraction incorporates the path concept) and of being very flexible in use. It has two drawbacks: it runs up against the combinatorial explosion of the number of states of the system (the deeper the search, the greater the number of paths), and it does not prove anything (not finding any path at depth n does not prove that there is none at depth n+1).

2. "Model-checking" (see A. Kerbrat: "Méthodes symboliques pour la vérification de processus communicants: étude et mise en oeuvre" ["Symbolic methods for verifying communicating processes: design and implementation"], PhD thesis, University Joseph Fourier, Grenoble, 1994, or K. L. McMillan: "Symbolic Model Checking", Kluwer Academic Publishers, 1993). "Model-checking" methods require modelling of the system in the form of automata. The automata of such modelling are fused into a single automaton in which each state corresponds to a global state of the model. It is then possible to verify properties described in temporal logic on the global automaton. The advantage of this method lies in the richness of the temporal software, which enables a very large number of types of requests to be specified. It also facilitates simulation. However, it has the limitation of very quickly generating a global automat of gigantic size which as a general rule can therefore not be constructed, despite a number of techniques for reducing the size of the automaton (use of global automaton coding techniques, fabrication of a model of the global automaton with weaker properties, etc.).

3. Proof by theorems (see J.-R. Abrial: "The B-book", Cambridge University Press, 1995, or B. Chetali: "Formal verification of concurrent programs: How to specify UNITY using the Larch Prover", Technical report, INRIA, France, 1995). Here the model consists of a set of logic formulae which describe its basic properties. A new property to be verified being given in the form of a logical formula, a proof will consist of successive steps enabling the new logic formula to be obtained from logical formulae of the model and inference rules. This method has the advantage of producing true formal proofs. However, there are no good inference strategies at present and the computer is almost always reduced merely to solving the simple steps of the proof and leaving the hard parts to the human logicist.

In the field of Petri networks, it is known in the art to use optimisation methods employing linear programming to verify systems. However, linear programming is used only on very highly constrained models which therefore cannot be used to model real systems (see J. Esparza et al.: "A polynomial-time algorithm to decide liveness of bounded free choice nets", Theoretical Computer Science, 102: 185–205, 1992), or to generate the set of invariants of the model studied (in particular the Fourier-Motzkin algorithm), which set is constructed without discernment and rapidly becomes of gigantic size.

More recently, the direct use of integer programming on a communicating automata model has been studied (see J. C. Corbett: "Automated Formal Analysis Methods for Concurrent and Real-Time Software", PhD thesis, Department of Computer Science, University of Massachusetts, USA, 1992). However, using integer programming does not provide sufficient algorithms and most importantly cannot perform proofs on the model. This research team studied the power of expressivity of the request system in depth and deduced that it was very close to temporal logic.

Another use of linear programming in the field of verification is described by J. L. Lambert ("Présentation du projet validation de protocoles par programmation linéaire" ["Description of the protocol validation by linear programming project"], Technical Report 27, Greyc, University of Caen, 1994). This approach does not involve any concept of ordering messages, which constitutes a limitation on the operating conditions of the system which can be analysed.

The object of the present invention is to enrich verification techniques by proposing a method that is capable of proving properties of the system studied and whose complexity does not increase too dramatically with the size of the system.

SUMMARY OF THE INVENTION

The invention therefore proposes a method of verifying the operation of a system modelled by a system of automata synchronised by a set of messages, including the following operations:

breaking down the system into N subsystems numbered from n=1 to n=N;

providing parameters describing each subsystem n ($1 \leq n \leq N$) in the form of a respective automaton composed of a set $E_n$ of states $e_n^i$ of the subsystem n with a set $A_n$ of transitions $a_n^j$ between pairs of states of the set $E_n$, each transition a of the set $A_n^j$ being associated with a subset $M_n^j$ of the set of synchronisation messages to translate the fact that each message of the subset $M_n^j$ arises when the subsystem described changes state in accordance with the transition $a_n^j$;

constructing a system of linear equations including, for $1 \leq t \leq T$ and $1 \leq n \leq N$, on the one hand flow equations of the form:

$$e_n^i(t-1) = \sum_{j \in B_n^i} a_n^j(t) \text{ for } e_n^i \in E_n$$

and of the form:

$$e_n^i(t) = \sum_{j \in C_n^i} a_n^j(t) \text{ for } e_n^i \in E_n,$$

and on the other hand synchronisation equations of the form.

$$m^k(t) = \sum_{j \in D_n^k} a_n^j(t) \text{ for } m^k \in M_n,$$

where T designates a number of successive steps of the operation of the system, $B_n^i$ designates the set of the indices j such that the transition $a_n^j$ of the set $A_n$ starts from the state $e_n^i$ of the set $E_n$, $C_n^i$ designates the set of the indices j such that the transition $a_n^j$ of the set $A_n$ leads to the state $e_n^i$ of the set $E_n$, $M_n$ designates the union of the subsets of messages $M_n^j$ respectively associated with the transitions of the set $A_n$, $D_n^k$ designates the set of the indices j such that a message $m^k$ of the set $M_n$ belongs to the subset $M_n^j$ associated with the transition $a_n^j$ of the set $A_n$, the variable $e_n^i(t)$ ($0 \leq t \leq T$) is an unknown of the linear system associated with the state $e_n^i$ of the set $E_n$ and with step t, the variable $a_n^j(t)$ ($1 \leq t \leq T$) is an unknown of the linear system associated with the transition $a_n^j$ of the set $A_n$ and with step t, the variable $m^k(t)$ ($1 \leq t \leq T$) is an unknown of the linear system associated with the message $m^k$ of the set of synchronisation messages and with step t;

defining a property of the system to be verified in the form of additional linear constraints imposed on the unknowns of the linear system;

applying a linear programming solution method to the linear system subject to the additional constraints;

analysing the result of linear programming to determine if said property is verified by the system; and assisting a user to detect malfunction of said system or to obtain evidence of correct operation of said system.

This method has few points in common with the three prior art methods commented on above. Like "model-checking", it is based on modelling in the form of communicating automata but the comparison stops there. The system of requests is of the same order of expressivity as temporal logic, although it is closer to the path concept than the latter: in the present instance, requests are typically based on questions of accessibility of states and transitions and sending or receiving messages. A fundamental difference compared to "model-checking" is that the method operates directly on the automata of the model without using a global automaton produced from all the automata of the model. Also, the proofs given by linear programming correspond to sums of equations which can yield an equation that is trivially false. They are therefore unrelated to proof by theorems. The method can also furnish paths validating a request. However, this path is constructed directly, without running through these states, as simulation or model-checking would. The solution proposed by linear programming is not necessarily an integer value path. It is therefore necessary to construct a model of automata which minimises the number of non-integer solutions and which enables them to be interpreted and eliminated when they occur, by introducing pertinent additional linear constraints.

DESCRIPTION OF PREFERRED EMBODIMENTS

Figure 1:
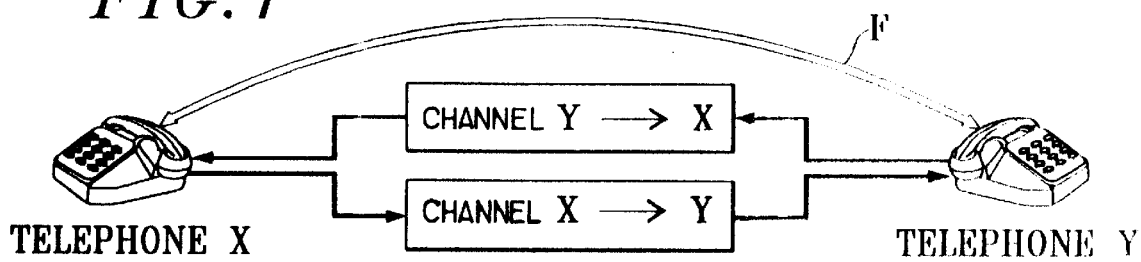
FIG. 1 is block diagram of a simple example of a system to which the present invention can be applied.

Automata are routinely used in the field of verification. They have the advantage of being both expressive as to their translation of the operation of the system and easy for the user to learn and manipulate. The type of automaton used by the method is fairly conventional; the invention resides essentially in the use made of this modelling by automata. All the elements of the system are described in the form of automata. These elements, or sub-systems, can be devices belonging to the system, whose automata represent the states of operation. They can equally be of a software kind: instruction or command exchanged, data, transmission channels (queues, stacks, etc.).

The system studied being divided into N sub-systems, each of these sub-systems n ($1 \leq n \leq N$) is described in the form of an automaton $S_n$ with the aid of parameters defining the states and the transitions of the automaton. Those parameters comprise:

the number l(n) of states of the automaton $S_n$; the set of the l(n) states of the automaton $S_n$ is denoted:

$$E_n = \{e_n^i, 1 \leq i \leq l(n)\};$$

the number j(n) of transitions of the automaton $S_n$; the set of the J(n) transitions of the automaton $S_n$ is denoted:

$$A_n = \{a_n^j, 1 \le j \le J(n)\};$$

for each transition $a_n^j$: the identification of the state $e_n^i$ from which that transition arises and of the state $e_n^{i'}$ to which that transition leads. In other words, the transition $a_n^j$ causes the sub-system represented by the automaton $S_n$ to change from the state $e_n^i$ to the state $e_n^{i'}$.

These parameters enable two sets $B_n^i$ and $C_n^i$ to be determined for each state $e_n^i$ of the set $E_n$ ($1 \le j \le J(n)$). The set $B_n^i$ is the set of the indices j such that $1 \le j \le J(n)$ and such that the transition $a_n^j$ starts from the state $e_n^i$. The set $C_n^i$ is the set of indices j such that $1 \le j \le J(n)$ and such that the transition $a_n^j$ yields the arrival state $e_n^i$.

A computer is used to perform the calculations required by the method of the invention. That computer is typically equipped with a graphical interface enabling the user to supply the above parameters, defining the structure of the automata, in a simple manner by drawing nodes representing the states $e_n^i$ connected by arcs representing the transitions $a_n^j$. The sets $B_n^i$ and $C_n^i$ can then be formed as and when states and transitions are introduced.

From these sets and an integer number T supplied by the user, the computer constructs $$n_f = 2T \times \sum_{n=1}^{N} l(n)$$

flow equations. The number T represents a number of successive steps of operation of the system over which that operation is the subject of verification.

The expressions of these flow equations are, for $1 \le t \le T$, $1 \le n \le N$ and $1 \le l \le l(n)$:

$$e_n^i(t-1) = \sum_{j \in B_n^i} a_n^j(t) \qquad (1f)$$

$$e_n^i(t) = \sum_{j \in C_n^i} a_n^j(t) \qquad (2f)$$

In these flow equations (1f) and (2f), the variables $e_n^i(t)$ and $a_n^j(t)$ are in principle binary values (0 or 1). When $e_n^i(t)=1$ ($0 \le t \le T$), the sub-system n described by the automaton $S_n$ is in the state el at the end of step t and at the start of step t+1. Otherwise, $e_n^i(t)=0$. When $a_n^j(t)=1$ ($1 \le t \le T$), the sub-system n described by the automaton $S_n$ changes state according to the transition $a_n^i$ in step t; otherwise $a_n^j(t)=0$.

The system of automata $S=\{S_n, 1 \le n \le\}$ is synchronised by a set $M=\{m^k, 1 \le k \le K\}$ of messages translating the interworking of the N sub-systems. The messages $m^k$ of the set M are received or sent by the sub-systems represented by the automata $S_n$ when the latter effect transitions of the sets $A_n$. The synchronisation messages $m^k$ therefore accompany the transitions $a_n^j$ so that their occurrence can be modelled using the automata $S_n$. For the user, this consists of associating each transition $a_n^j$ of the set $A_n$ of transitions of an automaton $S_n$ with a subset $M_n^j$ of the set M of synchronisation messages. This association signifies that each message of the subset $M_n^j$ occurs when the sub-system described by the automaton $S_n$ changes state in accordance with the transition $a_n^j$. When a transition $a_n^j$ of an automaton $S_n$ is passed, any other automaton $S_{n'}$ having one or more transitions $a_{n'}^{j'}$ such that $M_n^j \cap M_{n'}^{j'} \ne \emptyset$ accomplishes one of those transitions $a_{n'}^{j'}$.

This association is easy to define when a graphical interface of the computer provides the user with a graphical representation of the states and transitions of the automaton: it is sufficient to label each arc representing a transition with the message(s) $m^k$ which accompany it. The computer is then able to define the pertinent subsets $M_n^j$. It also defines, for each automaton $S_n$, the union $M_n$ of the subsets of messages $M_n^j$ respectively associated with the transitions of the set $A_n$, i.e.

$$M_n = \bigcup_{j=1}^{J(n)} M_n^j.$$

The number of messages of the set $M_n$ is noted $\mu(n)$. Finally, for each message $m^k$ of the set $M_n$, it defines the set $D_n^k$ of indices j such that $1 \le j \le J(n)$ and such that the message $m^k$ belongs to the subset $M_n^j$ associated with the transition $a_n^j$, i.e. $D_n^k\{j/m^k \in M_n^j\}$.

Some transitions $a_n^j$ may not be accompanied by any message of the set M ($M_n^j=\emptyset$). These transitions most often have identical departure and arrival states, which translates the fact that the subsystem in question does not change state in the absence of messages. Hereinafter, it is assumed that there is a transition of this kind, referred to as arc $\epsilon$, for each of the states of each automaton, and $\epsilon_n$ denotes the set of the indices of the l(n) arc $\epsilon$ relating to the automaton $S_n$: $\epsilon_n=\{j \in [1, J(n)]/M_n^j=\emptyset\}$. However, this assumption corresponds only to one particular case, to which the invention is not limited.

From the sets $D_n^k$ defined by the synchronisation relations, the computer constructs $$n_s = T \times \sum_{n=1}^{N} \mu(n)$$

synchronisation equations, whose expressions are, for $1 \le t \le T$, $1 \le n \le N$ and $m^k \in M_n$:

$$m^k(t) = \sum_{j \in D_n^k} a_n^j(t) \qquad (3s)$$

where $m^k(t)$ is a variable which in theory is a binary variable (0 or 1). When $m^k(t)=1$ the message $m^k$ comes during step t; otherwise, $m^k(t)=0$.

The flow equations and synchronisation equations (1f), (2f) and (3s) form a linear system whose variables $e_n^i(t)$, $a_n^j(t)$ and $m^k(t)$ constitute the unknowns. In accordance with the invention, this linear system is solved by a linear programming method to verify properties of the system defined in the form of linear constraints imposed on the unknowns of the linear system. This solution assumes that the unknowns $e_n^i(t)$, $a_n^j(t)$, $m^k(t)$ have positive or zero values, but not necessarily integer values.

Linear programming solution methods are standard in combinatorial optimisation. They are widely used in industry because of their efficiency and their scope of application (see for example Williams: "Model Building in Mathematical Programming" Wiley, 3$^{rd}$ edition, 1993; Chvatal: "Linear Programming", editions Freeman, 1983; or R. Saigal: "Linear Programming: A Modern Integrated Analysis", editions Kluwer, 1996).

At present software such as the CPLEX and OSL software can process systems of several million constraints and tens of millions of variables in a reasonable time. The complexity of existing algorithms, whether of the simplex or internal point type, is between that of linear and quadratic algorithms, in terms of the size of the problematic (meaning that a problematic twice as large will take between twice and four times as long to solve). However, given that in practice it is possible to use many optimising tricks, considerable savings can be obtained in terms of computation time.

Linear programming combines methods of finding a positive solution slaved to a set of linear constraints which maximises a criterion defined by a given linear equation. A conventional way to express this kind of problematic is as follows: a column vector x is sought of size p such that:

$$\begin{cases} \max c.x \\ A.x = b \\ x \geq 0 \end{cases} \quad (4)$$

where A is a matrix with m rows and p columns, c is a row rector of size p and b is a column vector of size m. It is possible to modify this problematic by integrating inequalities into it, removing certain constraints as to the positive sign of x, etc. However, the linearity of the set of equations must be preserved both in order to be able to use an efficient algorithm and to enable the results to be interpreted. The integrity constraints (this corresponds to integer programming) are prohibited for the same reasons.

To explain the linear programming proof concept, the problematic is formulated in the following manner. A vector x of size p is still sought, but now such that:

$$\begin{cases} A.x = b \\ x \geq 0 \end{cases} \quad (5)$$

The problem (5) seems to be a simple one because all that is required is to satisfy the set of constraints, without also optimising a linear criterion. However, it is in fact of the same difficulty as the problematic (4). The problematic (5) then has the following property, referred to as the Farkas lemma: the system $A.x=b$, $x \leq 0$ has no solution if and only if the dual system $y.A \leq 0$, $y.b \leq 0$ has one.

If it is assumed that the system of constraints A is the translation of the automata described hereinabove and of an accessibility request to be verified, the vector x being made up of the unknowns $e_n^i(t)$, $a_n^j(t)$ and $m^k(t)$, the Farkas lemma assumes that: (i) either a path exists which validates the request, i.e. a column vector x of size p which is a solution of the direct problematic, (ii) or there is a proof that this path does not exist, i.e. a row vector y of size m which is a solution of the dual problematic. The linear programming algorithm executed by the computer will therefore find this x or the corresponding y if it does not exist.

The additional linear constraints are defined by the user according to the property to be verified. As a general rule, linear constraints are provided for fixing an initial configuration of the system of automata, i.e. the values of the variables $e_n^i(0)$ for $1 \leq n \leq N$ and $1 \leq i \leq l(n)$. More generally, the initial state of an automaton $S_n$ will be subject to constraints of the form $$\sum_{i \in P_n} e_n^i(0) = 1, \sum_{i \notin P_n} e_n^i(0) = 0,$$

where $P_n$ designates a non-empty part of the range $[1, l(n)]$, which requires the initial state of the automaton to be in a certain part of the set $E_n$.

The additional constraints include other linear relations to be satisfied by the unknowns of the linear system, relating to the final state (t=T) of certain automata, to the accomplishing of certain transitions and/or to the sending of certain messages of the set M. In some cases, additional constraints can additionally be defined by introducing into the modelling process one or more specific automata referred to as observer automata.

In the context of the invention, the additional constraints can further include a linear criterion to be optimised, i.e. linear programming can also be used in accordance with the above formulation (4). This makes it possible to identify the best path in terms of the optimised criterion. Examples of such criteria are:

$$\sum_{t=1}^{T} \sum_{n=1}^{N} \sum_{j \in \varepsilon_n} a_n^j(t), \quad (i)$$

whose maximisation permits identification of the path which implies the fewest changes of state; the summation could also apply to only some of the automata $S_n$;

$$\sum_{t=1}^{T} \sum_{k=1}^{K} m^k(t), \quad (ii)$$

whose minimisation permits identification of the path requiring the least sending of synchronisation messages; the summation could also apply to only part of the set M of messages $m^k$;

$$\sum_{t=1}^{T} e_n^i(t), \quad (iii)$$

whose minimisation permits identification of the path for which an automaton $S_n$ remains for the shortest time in one of its states $e_n^i$ . . .

In the criteria indicated hereinabove, the sums could also be weighted.

In some cases linear programming yields a non-integer solution, at least one component of the vector x being other than 0 and 1. It is then not possible to draw an immediate conclusion as to the property examined: either there is no integer solution and the property is not verified or the non-integer solution conceals an integer solution and the property is verified.

Various approaches can be adopted if a non-integer solution is obtained. Thus the request can be refined by adding or modifying linear constraints before applying the linear programming solution method again. The user is guided in this process by the structure of the non-integer solution. For example, it is feasible to add a constraint to that message (such as $$\sum_{t=1}^{T} m^k(t) = 0)$$

if the solution path includes the component $m^k(t)=p/q$, p and q being integers such that $0<p<q$, and if the message $m^k$ seems to be "spurious" in relation to the property examined. Constraints of the same kind can be introduced if the user detects that, according to the non-integer solution, some automata are in a suspect state with a fractional state variable $e_n^i(t)$, or are following a suspect transition with a fractional transition variable $a_n^j(t)$ . . . This approach frequently yields a conclusive integer solution. In some cases, the number T of computation steps can also be reduced in order to eliminate non-integer solutions in which fractional transitions repeated over several steps can constitute a complete transition. To get round non-integer solutions, recourse may also be had to linear criteria to be optimised. If the first solution of the linear system for verifying a property yields a non-integer solution, other solutions of the same system can be looked for which optimise various linear criteria. Some of these other solutions may be integer solutions and therefore prove the required property. If not, the various attempts can assist a diagnosis that the property is not verified.

A non-integer solution can also be obtained if certain modelling defects are present in the system of synchronised automata. The structure of the non-integer solution can assist the user to detect such defects and to remedy them by appropriate modification of the parameters describing the system.

The method will now be illustrated with the aid of an example represented in the accompanying drawings. This example is intentionally highly simplified to illustrate the operations performed in accordance with the invention as clearly as possible. Clearly the power of linear programming methods means that much larger systems can be verified in practice.

The system studied, represented schematically in FIG. 1, is a telecommunication system comprising two telephones X and Y between which speech communication symbolised by the arrow F can be established. The operation to be verified relates to a signalling protocol used to set up or clear down a call between the two telephones. The first step is to break the system down into N=4 subsystems respectively corresponding to the telephones X and Y, a transmission channel from the telephone X to the telephone Y and a transmission channel from the telephone Y to the telephone X.

For simplicity, it is assumed that only the telephone X is able to request the setting up of a connection to the telephone Y, but that either of the two telephones can request disconnection. Under these conditions, the set M of synchronisation messages is made up of six messages (K=6):

- $m^1$ sent by telephone X to request the setting up of a connection with Y,
- $m^2$ sent by telephone X to request disconnection;
- $m^3$ sent by telephone Y to request disconnection;
- $m^4$ received by telephone Y to connect it to X;
- $m^5$ received by telephone Y to disconnect it; and
- $m^6$ received by telephone X to disconnect it.

Figure 2:
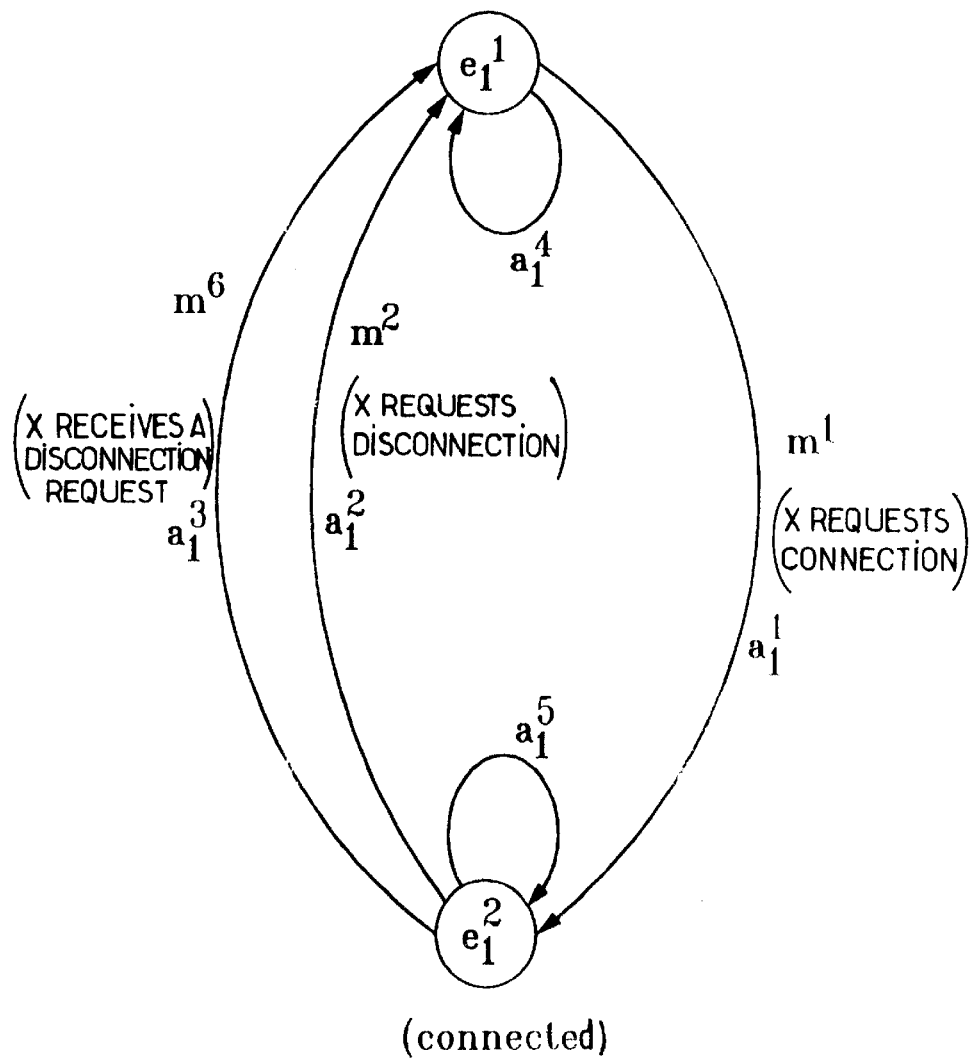
FIGS. 2 to 5 are diagrams of automata representing elements of the system from FIG. 1.
Figure 3:
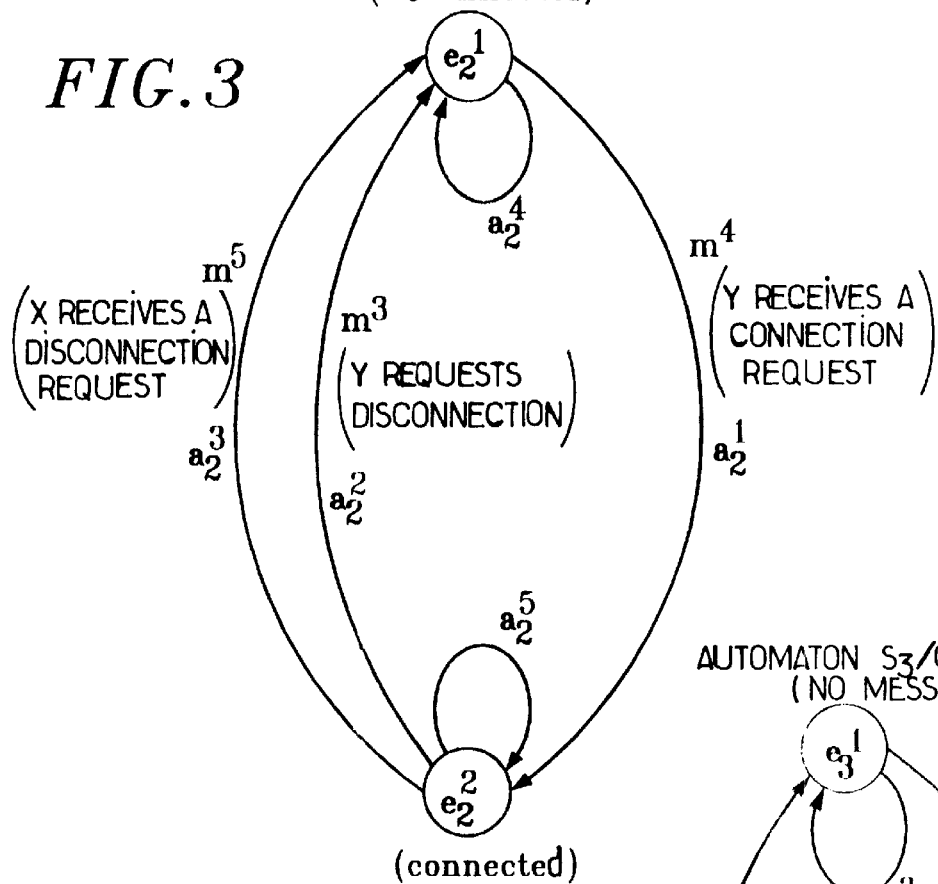

The synchronised automata $S_1$ and $S_2$ relating to the telephones X and Y are shown in FIGS. 2 and 3. They each have two states ("connected" and "disconnected") and five transitions: I(1)=I(2)=2, J(1)=J(2)=5. The two automata introduce the following equations into the linear system to be solved:

Flow equations: (n = 1 or 2)

$$B_n^1 = \{1, 4\} \rightarrow e_n^1(t-1) = a_n^1(t) + a_n^4(t) \tag{1f}$$

$$B_n^2 = \{2, 3, 5\} \rightarrow e_n^2(t-1) = a_n^2(t) + a_n^3(t) + a_n^5(t) \tag{1f}$$

$$C_n^1 = \{2, 3, 4\} \rightarrow e_n^1(t) = a_n^2(t) + a_n^3(t) + a_n^4(t) \tag{2f}$$

-continued $$C_n^2 = \{1, 5\} \rightarrow e_n^2(t) = a_n^1(t) + a_n^5(t) \tag{2f}$$

Synchronisation equations:

$M_1 = \{m^1, m^2, m^6\}$, $$D_1^1 = \{1\} \rightarrow m^1(t) = a_1^1(t) \tag{3s}$$

$$D_1^2 = \{2\} \rightarrow m^2(t) = a_1^2(t) \tag{3s}$$

$$D_1^6 = \{3\} \rightarrow m^6(t) = a_1^3(t) \tag{3s}$$

$M_2 = \{m^3, m^4, m^5\}$ $$D_2^3 = \{2\} \rightarrow m^3(t) = a_2^2(t) \tag{3s}$$

$$D_2^4 = \{1\} \rightarrow m^4(t) = a_2^1(t) \tag{3s}$$

$$D_2^5 = \{3\} \rightarrow m^5(t) = a_2^3(t) \tag{3s}$$

Figure 4:
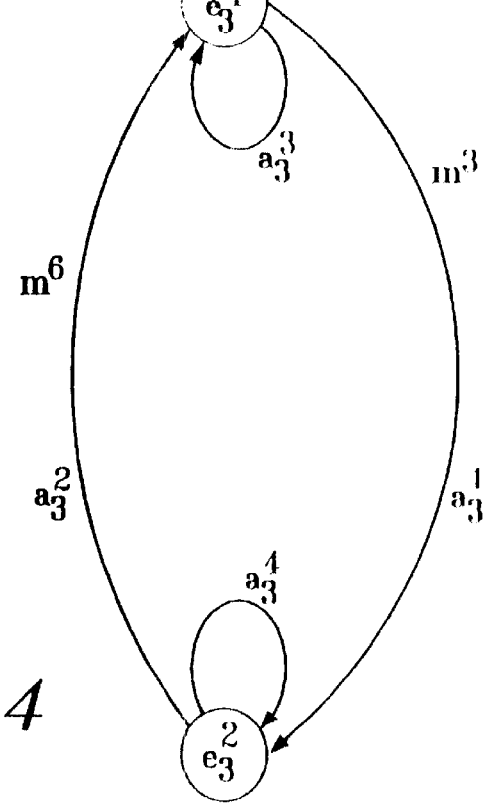

The transmission channel from the telephone Y to the telephone X is simple: it merely conveys the disconnection message from Y to X. It is represented by an automaton $S_3$ which has two states and four transitions (I(3)=2, J(3)=4), as shown in FIG. 4. This automaton introduces the following equations into the linear system to be solved:

Flow equations:

$$B_3^1 = \{1, 3\} \rightarrow e_3^1(t-1) = a_3^1(t) + a_3^3(t) \tag{1f}$$

$$B_3^2 = \{2, 4\} \rightarrow e_3^2(t-1) = a_3^2(t) + a_3^4(t) \tag{1f}$$

$$C_3^1 = \{2, 3\} \rightarrow e_3^1(t) = a_3^2(t) + a_3^3(t) \tag{2f}$$

$$C_3^2 = \{1, 4\} \rightarrow e_3^2(t) = a_3^1(t) + a_3^4(t) \tag{2f}$$

Synchronisation equations:

$M_3 = \{m^3, m^6\}$, $$D_3^3 = \{1\} \rightarrow m^3(t) = a_3^1(t) \tag{3s}$$

$$D_3^6 = \{2\} \rightarrow m^6(t) = a_3^2(t) \tag{3s}$$

Figure 5:
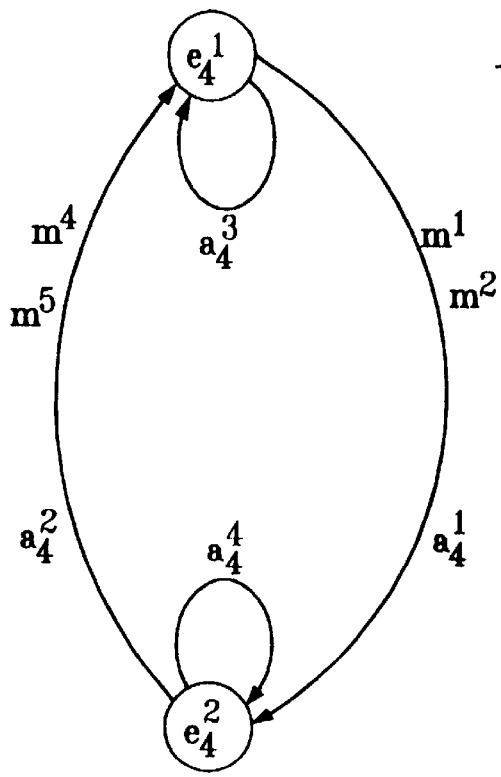
Figure 6:
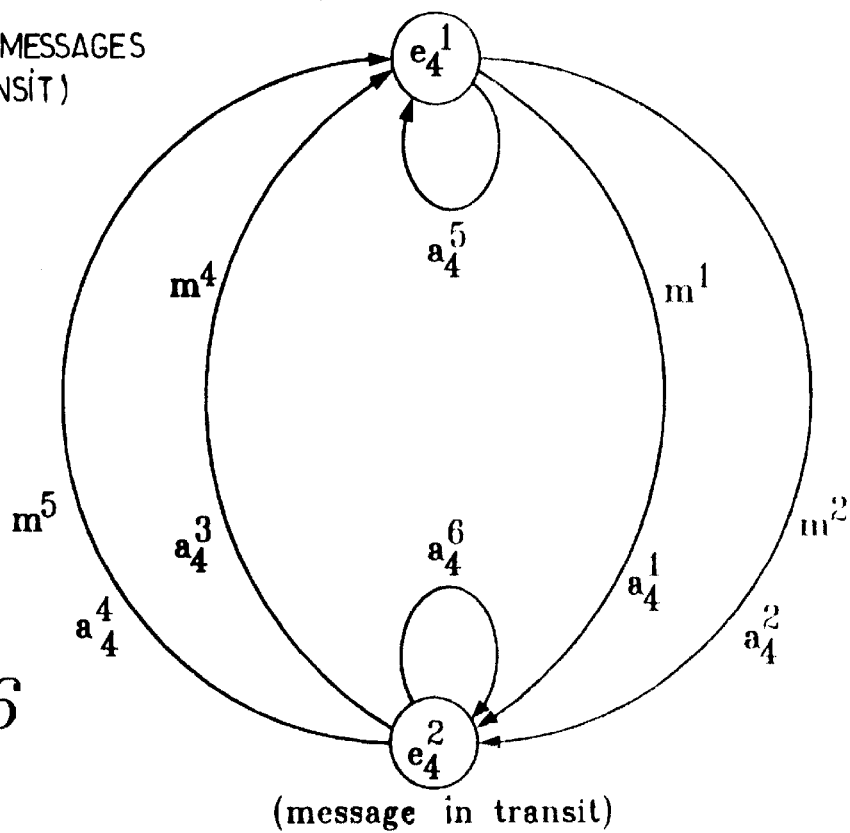
FIGS. 6 and 7 are variants of the automaton from FIG. 5.
Figure 7:
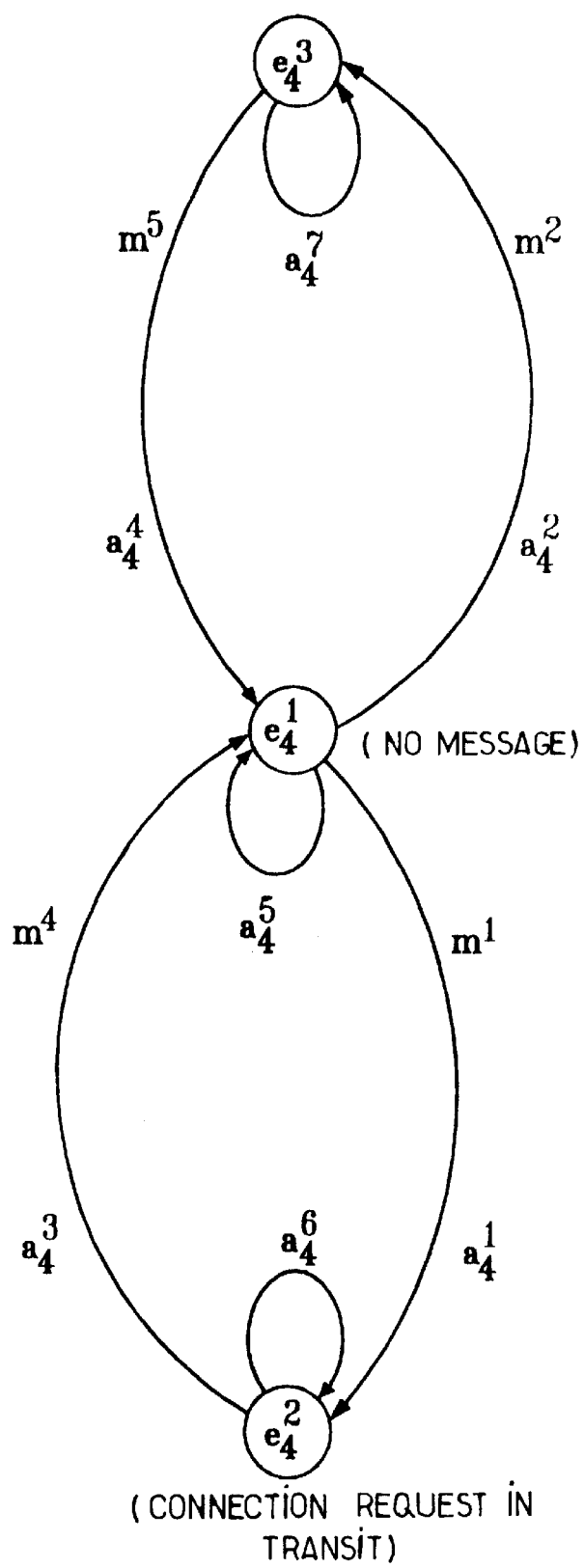

For the transmission channel from the telephone X to the telephone Y, three different situations are shown in FIGS. 5, 6 and 7.

Consider first the situation of FIG. 5, in which the channel accepts messages only in packets of two (for example for reasons of transmission efficiency). After receiving the packet comprising the two messages $m^1$ and $m^2$ (transition $a_4^1$), the channel forwards the corresponding two messages $m^4$ and $m^5$ to the telephone Y (transition $a_4^2$). Note that this transmission is modelled as being asynchronous because the automaton $S_4$ is authorised to remain in the state $e_4^2$ along an arc $\epsilon$ (transition $a_4^4$). To model a synchronous transmission, it would be sufficient to eliminate this transition $a_4^4$ from the set $A_4$ of transitions of the automaton. The automaton $S_4$ of FIG. 5 has two states and four transitions (I(4)=2, J(4)=4). It introduces the following equations into the linear system to be solved:

Flow equations:

$$B_4^1 = \{1, 3\} \rightarrow e_4^1(t-1) = a_4^1(t) + a_4^3(t) \tag{1f}$$

-continued $$B_4^2 = \{2, 4\} \rightarrow e_4^2(t-1) = a_4^2(t) + a_4^4(t) \qquad (1f)$$

$$C_4^1 = \{2, 3\} \rightarrow e_4^1(t) = a_4^2(t) + a_4^3(t) \qquad (2f)$$

$$C_4^2 = \{1, 4\} \rightarrow e_4^2(t) = a_4^1(t) + a_4^4(t) \qquad (2f)$$

Synchronisation equations:

$$M_4 = \{m^1, m^2, m^4, m^5\},$$

$$D_4^1 = \{1\} \rightarrow m^1(t) = a_4^1(t) \qquad (3s)$$

$$D_4^2 = \{1\} \rightarrow m^2(t) = a_4^1(t) \qquad (3s)$$

$$D_4^4 = \{2\} \rightarrow m^4(t) = a_4^2(t) \qquad (3s)$$

$$D_4^5 = \{2\} \rightarrow m^5(t) = a_4^2(t) \qquad (3s)$$

A first series of properties of the system that can be verified is the fact that each operating state of a subsystem n represented by a state of the corresponding automaton $S_n$ can be reached from a given starting configuration and that each synchronisation message of the set M can follow.

The starting configuration is, for example: both telephones disconnected and no message in transit on the channels; this corresponds to the following additional linear constraints for $1 \leq n \leq 4$: $e_n^1(0)=1$ and $e_n^1(0)=0$.

To verify if the state $e_n^i$ of an automaton $S_n$ can be reached, the additional constraint $e_n^i(T)=1$ is imposed by choosing a moderate value for the number T. If linear programming provides a solution, the state $e_n^i$ is accessible. If not, it is not accessible in T steps. In the latter case, the value of the number T can be increased to look for the possible existence of a solution. If the number T is considered to have become too large without any solution being found, it is possible to arrive at the diagnosis that the modelling is incorrect and remedy it, or to estimate that the system studied is non-functional in that one of its states is inaccessible. The system modelled by the automata $S_1$ to $S_4$ in FIGS. 2 to 5 does not verify this property as soon as the state whose accessibility is examined differs from the initial state: linear programming does not propose any solution. This translates the fact that the channel modelled by the automaton $S_4$ from FIG. 5 is totalling blocking since the automaton $S_1$ can never send the messages $m^1$ and $m^2$ at the same time.

The same kind of verification can be effected for the possibility of executing a given transition or sending a given message. For example, in the case of sending the message $m^5$ from the above starting configuration, the linear constraint $$\sum_{t=1}^{T} m^5(t) = 1$$

is added which translates the fact that the message $m^5$ will have been sent once during the T successive steps. Once again, the system modelled by the automata $S_1$ to $S_4$ from FIGS. 2 to 5 does not verify this property.

In the case of FIG. 6, the channel from the telephone X to the telephone Y can carry one or the other of the connection and disconnection messages (for example because it is a low bit rate channel). The automaton $S_4$ then has two states and six transitions (I(4)=2, J(4)=6). It introduces the following equations into the linear system to be solved:

Flow equations:

$$B_4^1 = \{1, 2, 5\} \rightarrow e_4^1(t-1) = a_4^1(t) + a_4^2(t) + a_4^5(t) \qquad (1f)$$

$$B_4^2 = \{3, 4, 6\} \rightarrow e_4^2(t-1) = a_4^3(t) + a_4^4(t) + a_4^6(t) \qquad (1f)$$

$$C_4^1 = \{3, 4, 5\} \rightarrow e_4^1(t) = a_4^3(t) + a_4^4(t) + a_4^5(t) \qquad (2f)$$

$$C_4^2 = \{1, 2, 6\} \rightarrow e_4^2(t) = a_4^1(t) + a_4^2(t) + a_4^6(t) \qquad (2f)$$

Synchronisation equations:

$$M_4 = \{m^1, m^2, m^4, m^5\}$$

$$D_4^1 = \{1\} \rightarrow m^1(t) = a_4^1(t) \qquad (3s)$$

$$D_4^2 = \{2\} \rightarrow m^2(t) = a_4^2(t) \qquad (3s)$$

$$D_4^4 = \{3\} \rightarrow m^4(t) = a_4^3(t) \qquad (3s)$$

$$D_4^5 = \{4\} \rightarrow m^5(t) = a_4^4(t) \qquad (3s)$$

The system modelled by the automata $S_1$ to $S_4$ from FIGS. 2, 3, 4 and 6 verifies the first series of properties mentioned above.

In a second phase of verification, properties more complex than the accessibility of a state, a transition or a message can be examined. For example, it is possible to determine if any message received by a telephone corresponds to that sent by the other telephone.

For example, to test that the message requesting disconnection by the telephone X is always received correctly by the telephone Y, it is possible to examine if the inverse property is verified for a certain path in the model of automata by adding the following eleven linear constraints:

$$e_1^1(0) = e_2^1(0) = 0, e_1^2(0) = e_2^2(0) = 1 \qquad \text{(telephones connected at } t = 0\text{)}$$

$$e_3^1(0) = e_4^1(0) = 1, e_3^2(0) = e_4^2(0) = 0 \qquad \text{(channels empty at } t = 0\text{)}$$

$$m^2(1) = 1 \qquad (X \text{ requests disconnection in } 1^{st} \text{ step})$$

$$\sum_{t=1}^{T} m^1(t) = 0 \qquad \text{(no further connection request)}$$

$$\sum_{t=1}^{T} m^4(t) = 1 \qquad (Y \text{ receives a connection request)}$$

Figure 8:
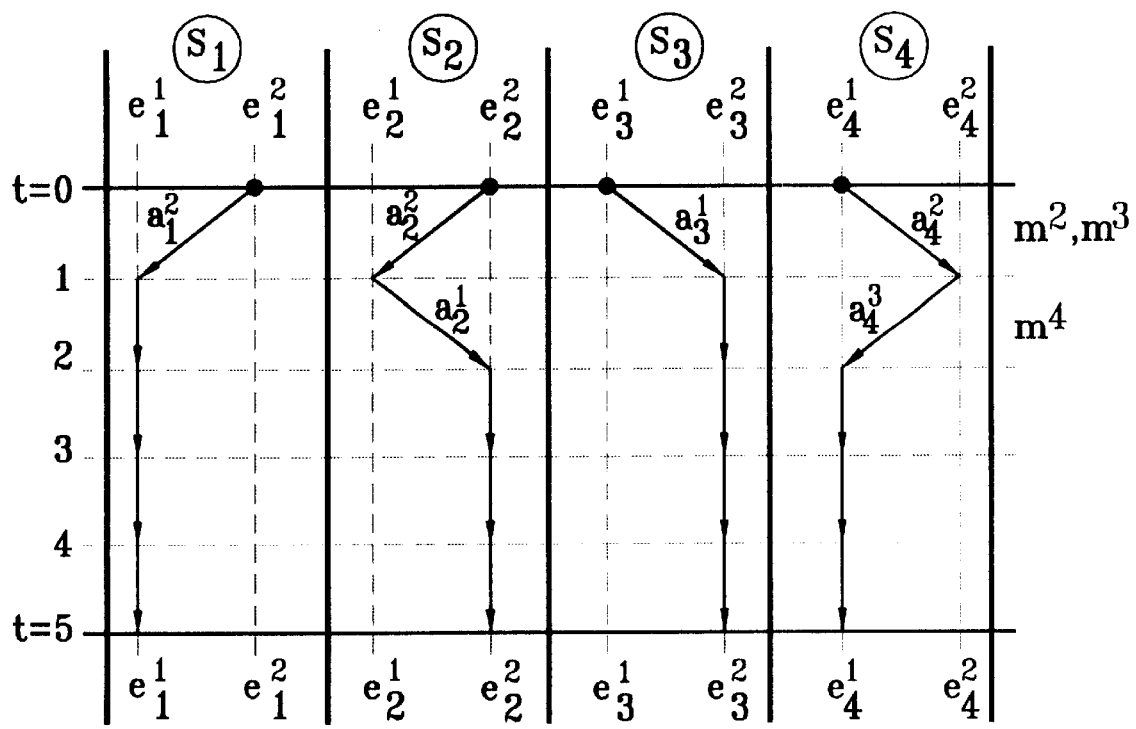
FIGS. 8 to 11 are diagrams showing paths that the method can show up in the system of automata.

FIG. 8 shows a path forming a solution in T=5 steps of the linear system subject to these eleven additional constraints, in the case of the system modelled by the automata $S_1$ to $S_4$ from FIGS. 2, 3, 4 and 6. As the property verified reveals abnormal operation of the system, it is possible to deduce from the existence of this solution procured by linear programming that the modelled system is malfunctioning. The user can interpret the malfunction: the channel from X to Y modelled in FIG. 6 can introduce errors such that it appears necessary to distinguish between the messages to prevent this type of malfunction.

Figure 9:
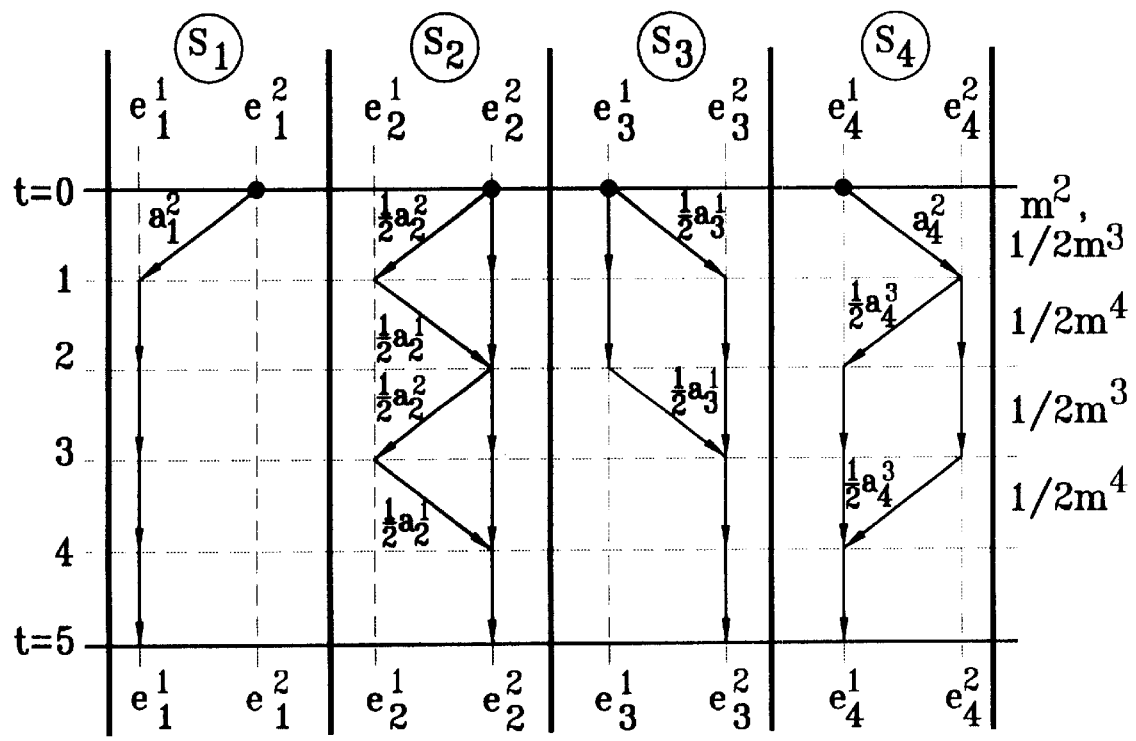

The FIG. 8 solution is not necessarily supplied directly by linear programming. The linear system subject to the eleven additional constraints accepts non-integer solutions that linear programming may initially produce. FIG. 9 shows one such non-integer solution. If the user obtains this solution he cannot immediately draw any conclusion as to the property examined. To the contrary, the user can observe that the messages m³ and m⁴ seem to be duplicated and attempt to reduce the number T of steps of operation. For T=2, a new solution therefore yields the integer solution of FIG. 8.

In the case of FIG. 7, the channel from the telephone X to the telephone Y can carry one or the other of the connection and disconnection messages, distinguishing between the two messages. The automaton $S_4$ then has three states and seven transitions (I(4)=3, J(4)=7). It introduces the following equations into the linear system to be solved:

Flow equations:

$$B_4^1 = \{1, 2, 5\} \rightarrow e_4^1(t-1) = a_4^1(t) + a_4^2(t) + a_4^5(t) \quad (1f)$$

$$B_4^2 = \{3, 6\} \rightarrow e_4^2(t-1) = a_4^3(t) + a_4^6(t) \quad (1f)$$

$$B_4^3 = \{4, 7\} \rightarrow e_4^3(t-1) = a_4^4(t) + a_4^7(t) \quad (1f)$$

$$C_4^1 = \{3, 4, 5\} \rightarrow e_4^1(t) = a_4^3(t) + a_4^4(t) + a_4^5(t) \quad (2f)$$

$$C_4^2 = \{1, 6\} \rightarrow e_4^2(t) = a_4^1(t) + a_4^6(t) \quad (2f)$$

$$C_4^3 = \{2, 7\} \rightarrow e_4^3(t) = a_4^2(t) + a_4^7(t) \quad (2f)$$

Synchronisation equations:

$$M_4 = \{m^1, m^2, m^4, m^5\}$$

$$D_4^1 = \{1\} \rightarrow m^1(t) = a_4^1(t) \quad (3s)$$

$$D_4^2 = \{2\} \rightarrow m^2(t) = a_4^2(t) \quad (3s)$$

$$D_4^4 = \{3\} \rightarrow m^4(t) = a_4^3(t) \quad (3s)$$

$$D_4^5 = \{4\} \rightarrow m^5(t) = a_4^4(t) \quad (3s)$$

Figure 10:
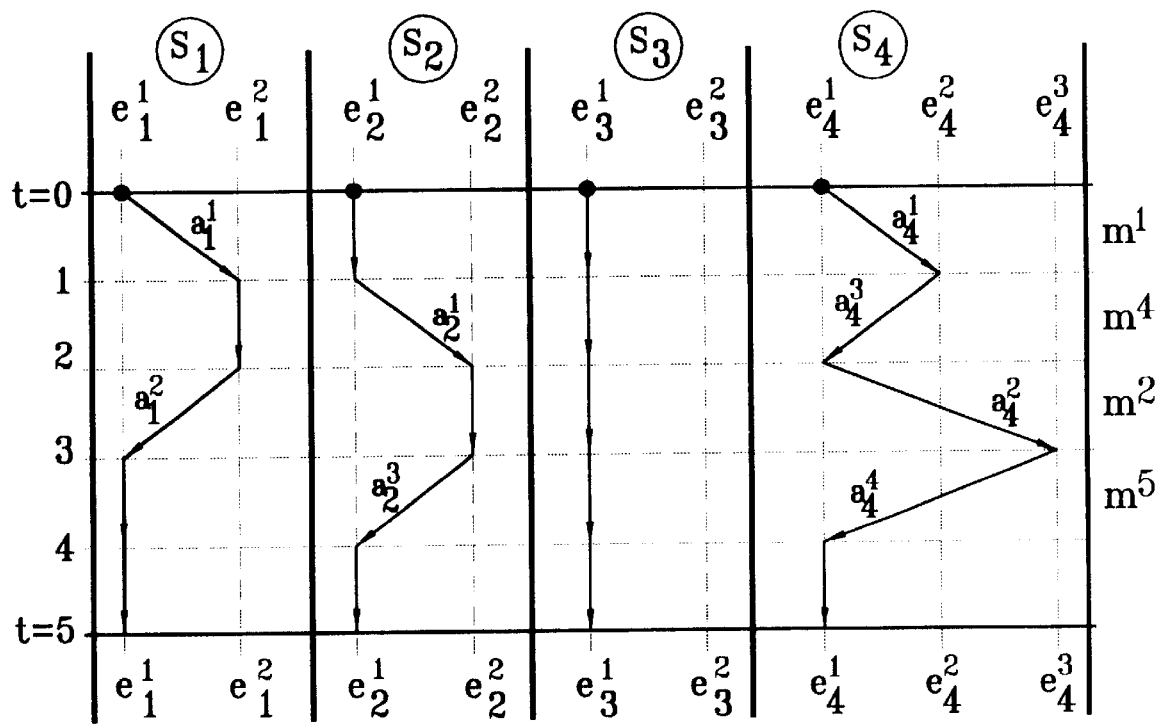

The system modelled by the automata $S_1$ to $S_4$ from FIGS. 2, 3, 4 and 7 verifies the first series of properties referred to above. FIG. 10 shows, for example, a path corresponding to a solution found by linear programming which proves that the system is capable of generating the message m⁵ in T=5 steps from the configuration in which both telephones are disconnected (additional constraints: $e_n^1(0)=1$, $e_n^2(0)=0$ ($1 \leq n \leq 4$), $e_4^3(0)=0$ and $$\sum_{t=1}^{T} m^5(t) = 1).$$

The system modelled by the automata $S_1$ to $S_4$ from FIGS. 2, 3, 4 and 7 does not verify the properties which have revealed the malfunctioning of the system modelled by the automata $S_1$ to $S_4$ from FIGS. 2, 3, 4 and 6 (in particular, linear programming does not supply any solution of the linear system subject to the eleven additional constraints referred to above).

A third verification phase considers whether the system can become blocked, i.e. if a channel can carry a message that the destination telephone is incapable of reading. For example, to determine if the channel from X to Y can contain a disconnection request message, although telephone Y is disconnected, the following additional constraints are used:

$e_1^1(0)=e_2^1(0)=1$, $e_1^2(0)=e_2^2(0)=0$ (telephones connected at t=0)

$e_3^1(0)=e_4^1(0)=1$, $e_3^2(0)=e_4^2(0)=e_4^3(0)=0$ (channels empty at t=0)

$e_2^1(T)=1$ (telephone Y disconnected at t=T)

$e_4^3(T)=1$ (disconnection message in transit at t=T)

Figure 11:
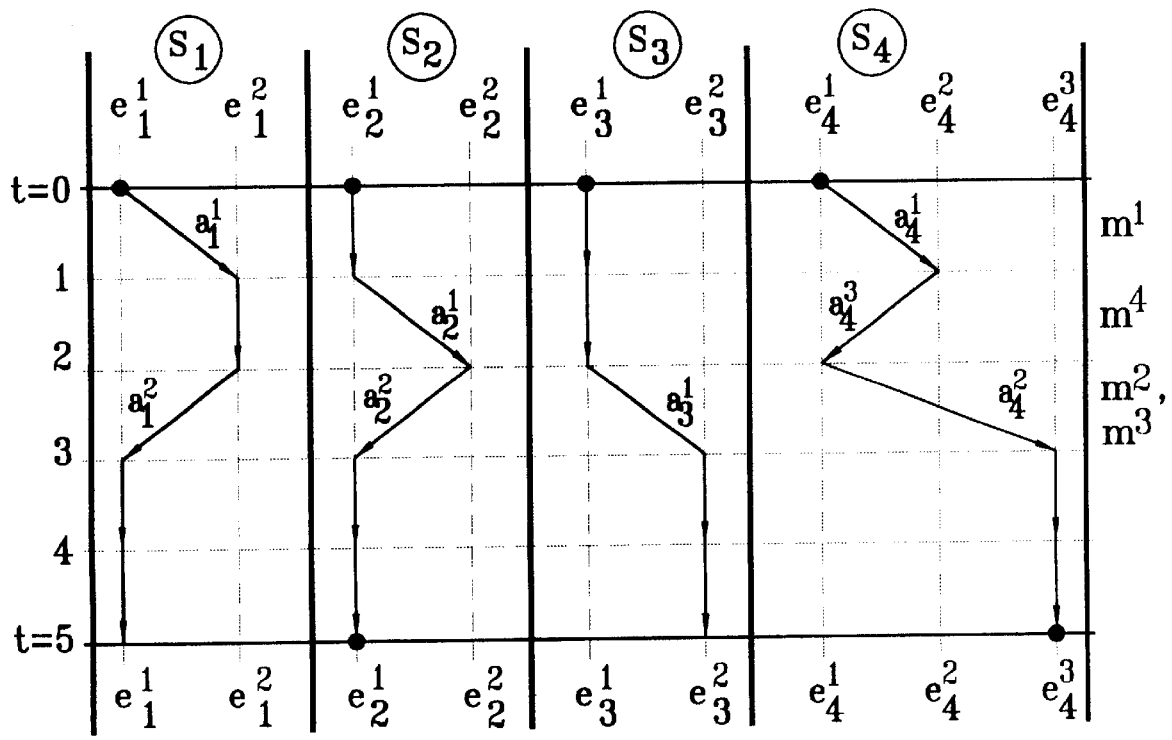

Linear programming shows that the linear system subject to these additional constraints has an integer solution, shown in FIG. 11. The system modelled by the automata $S_1$ to $S_4$ from FIGS. 2, 3, 4 and 7 can therefore become blocked. By analysing the FIG. 11 solution, the user discovers that the problematic arises if both telephones request disconnection simultaneously. To avoid this kind of problem, it is necessary to use a protocol with acknowledgement messages, which entails modifying each of the automata of the model and adding messages to the set M. The method according to the invention can then be applied to the new model in order to examine its properties.

What is claimed is:

1. Method of verifying the operation of a system modeled by a system of automata synchronised by a set of messages, including the following operations:

breaking down the system into N subsystems numbered from n=1 to n=N;

providing parameters describing each subsystem n ($1 \leq n \leq N$) in the form of a respective automaton composed of a set $E_n$ of states $e_n^i$ of the subsystem n with a set $A_n$ of transitions $a_n^i$ between pairs of states of the set $E_n$, each transition $a_n^j$ of the set $A_n$ being associated with a subset $M_n^j$ of the set of synchronisation messages to translate the fact that each message of the subset $M_n^j$ arises when the subsystem described changes state in accordance with the transition $a_n^j$;

constructing a system of linear equations including, for $1 \leq t \leq T$ and $1 \leq n \leq N$, on the one hand flow equations of the form:

$$e_n^i(t-1) = \sum_{j \in B_n^i} a_n^j(t) \text{ for } e_n^i \in E_n$$

and of the form:

$$e_n^i(t) = \sum_{j \in C_n^i} a_n^j(t) \text{ for } e_n^i \in E_n,$$

and on the other hand synchronization equations of the form:

$$m^k(t) = \sum_{j \in D_n^k} a^n(t) \text{ for } m^k \in M_n,$$

where T designates a number of successive steps of the operation of the system, $B_n^i$ designates the set of the indices j such that the transition $a_n^j$ the set $A_n$, starts from the state $e_n^i$ of the set $E_n$, $C_n^j$ designates the set of the indices j such that the transition $a_n^i$ of the set $A_n$, leads to the state $e_n^i$ of the set $E_n$, $M_n$ designates the union of the subsets of messages $M_n^j$ respectively associated with the transitions of the set $A_n$, $D_n^k$ designates the set of the indices j such that a message $m^k$ of the set $M_n$ belongs to the subset $M_n^j$ associated with the transition $a_n^j$ of the set $A_n$, the variable $e_n^i(t)$ ($0 \leq t \leq T$) is an unknown of the linear system associated with the state $e_n^i$ of the set $E_n$ and with step t, the variable $a_n^j(t)$ ($1 \leq t \leq T$) is an unknown of the linear system associated with the transition $a_n^j$ of the set $A_n$ and with step t, the variable $m^k(t)$ ($1 \leq t \leq T$) is an unknown of the linear system associated with the message $m^k$ of set of synchronisation messages and with step t;

defining a property of the system to be verified in the form of additional linear constraints imposed on the unknowns of the linear system;

applying a linear programming solution method to the linear system subject to the additional constraints;

analysing the result of linear programming to determine if said property is verified by the system; and assisting a user to detect malfunction of said system or to obtain evidence of correct operation of said system or to obtain evidence of correct operation of said system.

2. Method according to claim 1 wherein said property is considered to be verified when linear programming reveals that the system of linear equations subject to the additional constraints has a solution in which each of the variables has either the value 0 or the value 1, and said property is considered not to be verified if linear programming reveals that the system of linear equations subject to the additional constraints has no solution.

3. Method according to claim 1 wherein if linear programming reveals that the system of linear equations subject to the additional constraints has a solution in which at least one of the variables has a non-integer value the additional constraints are modified and the linear programming solution method is applied again.

4. Method according to claim 1, wherein the additional linear constraints comprise a combination of unknowns of the linear system which defines a linear criterion to be optimised by the linear programming solution method.

* * * * *

UNITED STATES PATENT AND TRADEMARK OFFICE
CERTIFICATE OF CORRECTION

PATENT NO.   : 6,466,646 B1
DATED        : October 15, 2002
INVENTOR(S)  : Dellacherie et al.

It is certified that error appears in the above-identified patent and that said Letters Patent is hereby corrected as shown below:

Column 14,
Line 27, please replace "transitions $a_n^i$" with -- transitions $a_n^j$ --.
Line 56, please replace "$E_n, C_n^j$" with -- $E_n$, $C_n^i$ --.
Line 57, please replace "transitions $a_n^i$" with -- transitions $a_n^j$ --.

Signed and Sealed this

Twenty-fifth Day of March, 2003

JAMES E. ROGAN
*Director of the United States Patent and Trademark Office*